(No Model.)
O. PARKER.
METHOD OF COOLING AIR FOR MAKING ICE AND COOLING IN GENERAL.
No. 259,421. Patented June 13, 1882.
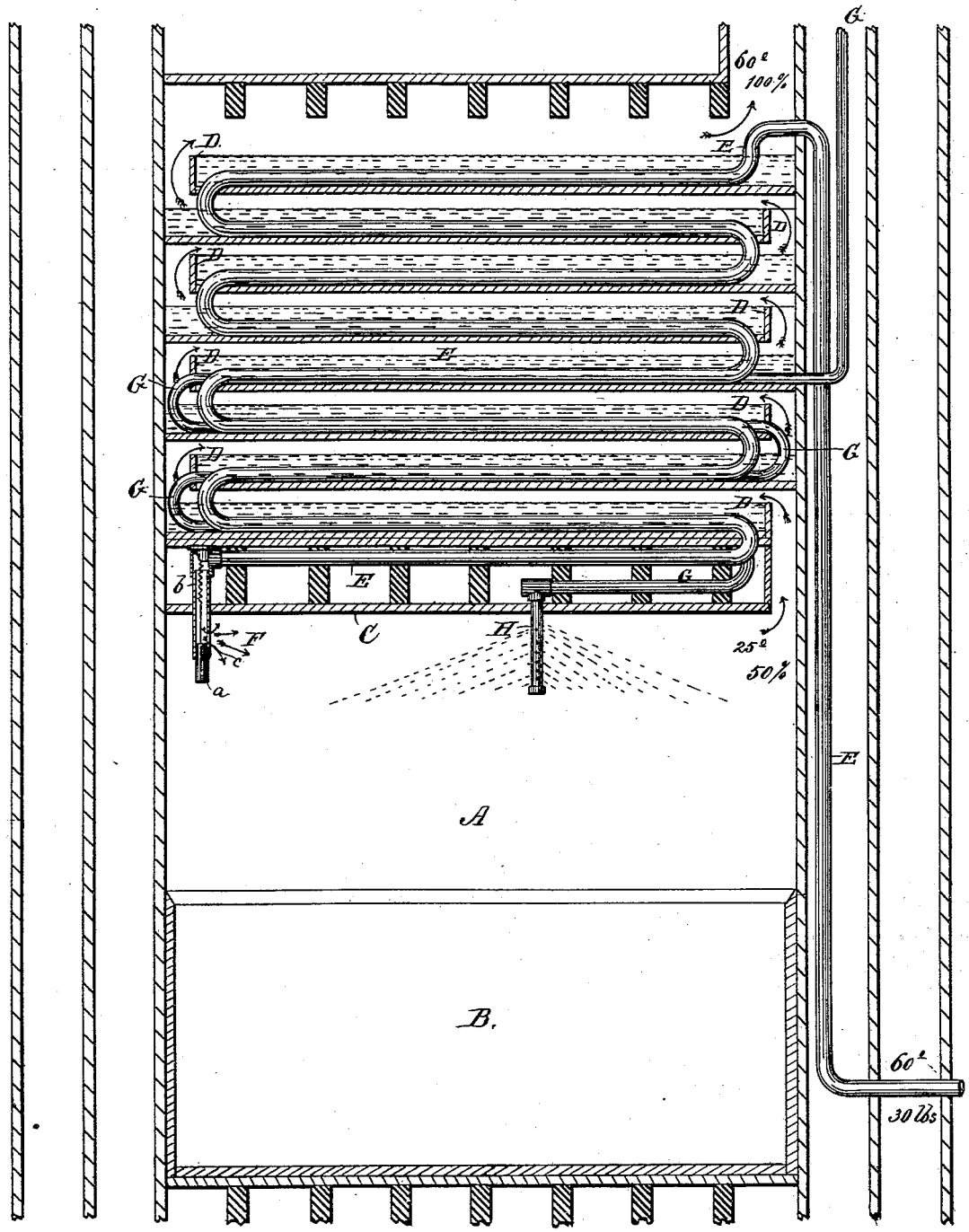
WITNESSES:
N. B. Brown
Edw. W. Byrn
INVENTOR:
Orin Parker
BY
ATTORNEYS.

UNITED STATES PATENT OFFICE.

ORIN PARKER, OF WASHINGTON, DISTRICT OF COLUMBIA.

METHOD OF COOLING AIR FOR MAKING ICE AND COOLING IN GENERAL.

SPECIFICATION forming part of Letters Patent No. 259,421, dated June 13, 1882.

Application filed November 21, 1881. (No model.)

*To all whom it may concern:*

Be it known that I, ORIN PARKER, of Washington city, District of Columbia, have invented a new and Improved Method of Refrigeration; and I do hereby declare that the following is a full, clear, and exact description of the same, reference being had to the accompanying drawing, forming part of this specification, in which the figure is a vertical sectional elevation through an apparatus for carrying out my invention.

My invention relates to an improved method of refrigeration designed to secure the most economical management of temperatures, and applicable either to ice-making or to cooling purposes in general. It is an improvement in that general method of refrigeration in which a body of air is compressed, the developed heat eliminated, and the relatively-cool compressed air then allowed to expand to produce a reduction in the temperature for useful effect. In such general method of cooling, the reduction of temperature incident to expansion is such that the air is nearly perfectly desiccated by the freezing out of the moisture, so that the cold is effected in the presence of a very dry atmosphere. Now, the air which escapes from the refrigerator or the freezing-room is at a temperature considerably below the normal, "normal" meaning either temperature of compressed air after heat of compression is eliminated or temperature of outside air, and notwithstanding the fact that some moisture may have been absorbed the humidity of this air is also far below saturation. This air, then, has three elements of utility, which can be economically conserved, one of which is its low temperature, another its low humidity or its quality for promoting evaporation at temperature at which it leaves room, and the third its rapidly-increasing capacity for carrying vapor and promoting evaporation as its temperature rises. I am awary that its low temperature has, in a measure, been conserved by passing the air through pipes that are immersed in the water which is to be frozen into ice, thus exchanging by conductivity the low temperature of the air for the normal temperature of the water.

My invention consists in supplementing this process by making available also the quality which this dry air has for promoting evaporation, and causing it both to impart its cold to a body of water by conductivity, and at the same time to evaporate a part of that water to further reduce its temperature, which body of water may be used either for cooling and further reducing the temperature of the compressed air before expansion or for cooling the water which is to be frozen into ice, or for both combined, the result being that no loss is incurred either in the temperature or humidity of the air which escapes, but the air passes off at a normal temperature and full saturation.

In the drawing, A represents the freezing-room, in the bottom of which is a tank, B, for catching the water that is to be frozen into ice, and in the top of which, and supported above a floor, C, is the apparatus for carrying out my invention. This freezing-room should be provided with a non-conducting lining to prevent the loss of useful effect. Above this floor is arranged a series of shallow tanks or troughs, D, which extend alternately from the wall on one side to a point near the wall on the other, so that a zigzag passage is left between the tanks. These tanks are filled with water, to which a proportion of salt may be added to prevent it from freezing, and the said water is to be preserved at a constant level in all of the troughs or tanks by suitable automatic float-valves.

E is the compressed-air pipe. This leads from any suitable air-compressor, and carries the air thus compressed and partially cooled, first into the water of the top tank, D, and after traversing the same descends into the water of the next lower tank, and after traversing the same descends again into the tank next below, and so on until it emerges through the floor C into the freezing-room, at which point it is provided with a pressure-regulator valve, F. This consists of a sliding plug, *a*, which is connected to a spiral spring, *b*, within the pipe, and which spiral spring holds the plug *a* over the hole *c* until a given pressure is attained, at which time the plug is forced downward and the air allowed to escape through the said hole and expand into the freezing-room. The merit of this particular form of pressure-regulator and the location of the spring in the pipes is that its automatic action is not defeated or affected by the congealation of moisture, as it would be if the parts were located outside the pipe in the presence of congealing moisture, it being understood that the temperature within the pipe is never to fall below the freezing-point.

G is the water-pipe, which carries the water to be frozen into the freezing-room. This pipe passes through the water of two or three or more of the lower tanks, and then enters the freezing-room, and is provided with a series of spray-nozzles, H. The water which is sprayed through these orifices is chilled by the expansion of the cold and compressed air, and, falling into the large tank, is frozen into ice, which, if it lacks solidity, is flooded from time to time with water to cement the same into a solid mass. Now, the air, after escaping from the pressure-regulator, it will be seen, upon expanding, produces a great degree of cold, which in freezing the water into ice abstracts a part of the heat from the water, and, taking this heat unto itself, brings its temperature up to, say, 25°, and at the same time the dryness of the air, due to initial desiccation from the freezing out of moisture, is partially satisfied again by the reabsorption of moisture from the water which is frozen into ice or the moisture existing on the articles to be cooled. This air, however, after having produced its useful effect in the freezing-room, will still have a low temperature—say 25°—and a low humidity, say fifty per cent. of saturation. Now, this air, possessed of these qualities, passes up and around the tanks or troughs D and escapes at the point X. Now, these tanks or troughs I make so as to give a large surface exposure for the evaporation of water. Thus the bottoms are made of porous wood or unglazed porcelain, and a large upper surface of water is exposed by the shallow character of the tanks, which surface exposure may be still further increased by shavings, wicking, or other capillary adjuncts, or even by spraying the water through the air as it passes out. Now, as the air at 25° and fifty per cent. humidity passes over the surface of the water in the tanks and against the moist bottom of the same, it will be seen that not only will the cold temperature of 25° be imparted to this water, but the air, having only half its proportion of moisture and an increasing avidity for moisture, due to the gradual rise of temperature, will promote the evaporation of the water and take into itself more of the heat of the water, and thus further reduce the temperature of the water in tanks D. This air then escapes at a temperature of, say, 60° and humidity of one hundred per cent., or the normal temperature and full saturation, and the amount of cold saved will be the difference between, say, 25° and 60° and fifty per cent. and one hundred per cent. of humidity or evaporating-power. This water then in the tank acts as the vehicle of this cold to give it to the compressed air in the immersed pipes, and also to the water in the immersed pipes, which is to be subsequently frozen. I prefer to divide this amount of cold, so to speak, between the compressed-air pipes and the water-pipes, so as to prevent an excessive amount of cold in the compressed-air pipe, which might have the effect of clogging up the compressed-air pipe by the congealed moisture.

In working my apparatus and process I propose to employ two freezing rooms and tanks with expansion-valves and spray-nozzles in connection with the same system of troughs and pipes above the floor C, so that one of these freezing-rooms may be employed for freezing while the workmen are engaged in removing the ice from the other.

Having thus described my invention, what I claim as new is—

1. In the process of cooling by expanding compressed air, the method of conserving waste energy, which consists in passing the expanded air from the freezing or cooling room over evaporating-surfaces to produce a reduction of temperature to be utilized for the purpose of lowering the temperature of the compressed air before expansion or for reducing the temperature of the water to be frozen, or for both, substantially as described.

2. The combination, with a freezing or cooling room, of the alternating tanks or evaporating-troughs D, filled with an evaporating-liquid, the compressed-air pipe E, immersed in said tanks and terminating in a pressure-regulator in the freezing-room, and the water-pipe G, also immersed in said evaporating-tanks and terminating in the freezing-room in spray-orifices, as described.

3. A compressed-air-expanding device consisting of a pipe having an opening in its sides, a sliding plug arranged within the pipe and adapted to close the opening, and a spiral spring, also arranged within the pipe and connected to the plug, as described.

ORIN PARKER.

Witnesses:
 EDWD. W. BYRN,
 G. W. HAY.